UNITED STATES PATENT OFFICE

WINFRID HENTRICH, OF WIESDORF-ON-THE-RHINE, AND CARL TAUBE, OF LEVER-KUSEN-ON-THE-RHINE, GERMANY, ASSIGNORS TO GENERAL ANILINE WORKS, INC., OF NEW YORK, N. Y., A CORPORATION OF DELAWARE

PROCESS OF PREPARING AZO DYESTUFFS

No Drawing. Application filed July 10, 1929, Serial No. 377,337, and in Germany July 16, 1928. Renewed August 19, 1932.

The present invention relates to a process of preparing azo dyestuffs.

According to this invention, azo dyestuffs are prepared either in substance, or on the fiber according to the dyeing or printing process by using in said processes the condensation products from any aromatic diazo-, tetrazo- or diazo-azo-compounds, with a primary organic amine containing at least one substituent inducing solubility in water, such as a carboxylic acid-, sulfonic acid group or the residue of a quaternary ammonium base. These condensation products used for the purpose of our invention may be represented by the general formula:

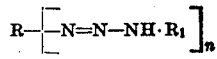

wherein R stands for an aromatic nucleus, which may be substituted by any substituents and which may contain one or more azo-groups, $R_1$ stands for alkyl, aryl or aralkyl containing at least one group inducing solubility in water and "$n$" stands for one of the numbers one and two.

These condensation products are obtainable by diazotizing or tetrazotizing in the usual manner with hydrochloric acid or sulfuric acid and sodium nitrite any aromatic amino-, or diamino-compound, and which may contain an azo group and introducing slowly this diazo-solution into an aqueous solution of an about equivalent quantity of a primary amine of the general formula:

wherein $R_1$ means alkyl, aryl or aralkyl containing at least one group inducing solubility in water, said solution containing an acid binding agent, such as sodium or potassium carbonate or bicarbonate or magnesium oxide or pyridine, favorably at temperatures between about 0° C. and +10° C. The new condensation products separate in a crystalline form during the reaction, or the separation is completed by salting out the new products. They are generally yellowish to brownish colored, crystallizing substances, and possess the important property of undergoing no decomposition in neutral or alkaline aqueous solution, whereas they are decomposed into their components by the action of diluted mineral acids or acid mineral acid salts or strong organic acids, such as formic acid, acetic acid or oxalic acid.

According to the invention, azo dyestuffs in substance are prepared by dissolving a condensation product of the above identified general formula in water and adding thereto an about equivalent quantity of any coupling component in aqueous solution. Then the mixture is acidified by a strong organic acid, such as formic acid, acetic acid or oxalic acid, until an about 3–10% acid solution has formed. The formation of the dyestuff begins immediately and can be accelerated by slowly heating, say to about 50–60° C.

If the solution is acidified with a mineral acid or an acid mineral acid salt, for example hydrochloric acid or sodium bisulfate, the decomposition of the condensation product proceeds more quickly; but in some cases, depending on the specific coupling component used, it is favorable to neutralize the free mineral acid, for example by the addition of soda or sodium acetate for effecting the coupling.

Otherwise the dyestuff may be prepared by introducing the aqueous solution of a coupling component into the aqueous solution of the condensation product to which an acid previously has been added; this method of preparing the dyestuff is equivalent to that described above.

In preparing the dyestuff on the fiber, especially on vegetable fibers, for example, on cotton, the material to be dyed is impregnated with a grounding liquor, generally containing such a coupling component as is not substituted by a carboxylic or sulfonic acid group, for example a 2.3-hydroxy-naphthoic acid arylide or a naphthol, centrifuged, wrung and developed for about half an hour in a diazo bath, rinsed, soaped at the boil, rinsed and dried.

For dyeing 50 grams of cotton, the grounding liquor is prepared by dissolving together about ½ gram to about 5 grams of the coupling component, about 1 to about 10 ccm. of caustic soda lye of 34° Bé., and about 1 to about 10 ccm. of Turkey red oil of 50% strength and making up the whole with water to 1 liter.

The developing bath is prepared by dissolving about 3 to about 10 grams of the above identified condensation product in 1 liter of water and adding thereto the necessary quantity of an acid, preferably formic acid or acetic acid, generally 20 to 50 ccm. of the concentrated acid being sufficient for 1 liter. Into this solution there is introduced the cotton impregnated with the coupling component, the bath is advantageously slowly heated to about 50–60° C., and when the diazo compound can no more be detected, the cotton is rinsed, soaped at the boil, rinsed and dried.

Our new process is favorably used for preparing dyeings on the fiber according to the printing process. The printing paste used for this purpose is prepared by mixing together about equivalent quantities of a condensation product as above identified and a coupling component, especially such one as contains no sulfonic and no carboxylic acid group, for example, a 2.3-hydroxynaphthoic acid arylide, adding to the mixture caustic soda lye in a quantity sufficient for dissolving the components and making up the mixture to a printing paste in the usual manner by adding thereto a thickening agent, such as starch or gum tragacanth and the necessary quantity of water, if desired, Turkey red oil. The fiber is printed with this printing paste in the usual manner, then it is dried and steamed and treated for a short time, say for about 20 seconds, in a bath containing an acid and if desired a suitable salt, such as Glauber's salt, sodium chloride or the like. Instead of drying and steaming the print, it may be directly developed with or without previously drying same, or the material after printing the same may be allowed to hang in the air for a prolonged time, say about 24 hours, before the developing process. Generally we carry out the developing process by passing the printed cotton through a bath containing about 3–10% of formic acid or acetic acid and 10% of Glauber's salt at an elevated temperature, say at temperatures between 50 and 90° C.

The invention is illustrated by the following examples, but is not restricted thereto:

*Example 1.*—4.6 parts by weight of the disodium salt of the diazo amino compound, obtainable from diazotized 3-nitro-4-amino-1-methylbenzene and aniline-2.5-disulfonic acid are dissolved in a litle water, an alkaline caustic soda solution of 1.8 parts by weight of aceto-acetic acid anilide is added and then gradually with stirring acetic acid. As soon as the reaction of the mixture becomes acid, the formation of the dyestuff begins, the completion of which can be accelerated by gentle heating. After working up in the customary manner, a yellow dyestuff is obtained. The same dyestuff can obviously also be produced in the presence of a substratum in the known manner.

In an exactly analogous manner an orange yellow azo dyestuff is obtained by splitting and subsequent coupling with acetoacetic acid-2-toluidide of the diazoamino compound, obtainable from diazotized 3-nitro-4-amino-1-methoxybenzene and aniline-2.4-disulfonic acid.

*Example 2.*—4.1 parts by weight of the diazo amino compound (disodium salt) obtainable from 4-chloro-2-amino-1-methylbenzene and 4-sulfo-2-aminobenzoic acid are dissolved in hot water and diluted with cold water to 1000 parts by volume, after which 20 parts of acetic acid and 5 parts of alum are added. On then developing with the solution thus obtained and which, after standing for a short time, is quite clear cotton impregnated in the customary manner with 2 - hydroxynaphthalene-3-carboxylic acid-2'-naphthylamide, the formation of the dyestuff on the fiber occurs quickly; it is carried to completion by gradually raising the temperature. The material is rinsed and soaped at the boil thus yielding a clear red of excellent fastness properties.

The procedure is quite analogous when dyestuffs are produced on the fiber from coupling components and the diazoamino compounds, obtainable from any desired amines of the benzene, naphthalene, anthraquinone, diphenyl, carbazole, amino- or diamino-azo series and the like and primary aromatic amines, containing groups inducing solubility in water, such as the sulfonic acid group or carboxylic acid group or both together.

Moreover, a fast red dyeing is obtained, for example by splitting the watersoluble condensation product from diazotized 1-amino-anthraquinone and 3-aminophenyl-trimethylammonium chloride of the formula:

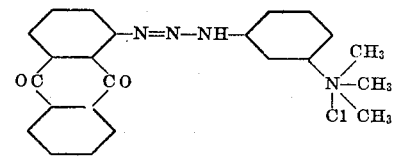

as described in the above example, then developing the resulting solution, cotton slop-padded with a solution of 2-hydroxy-naphthalene-3-carboxylic acid arylide.

Furthermore, the diazoamino compounds obtainable from diazo compounds by means of primary alkyl- or aralkylamines can also be used in the manner above described. For example, the diazoamino compound of the formula:

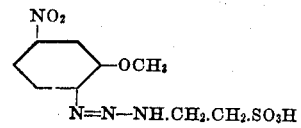

obtainable from 5-nitro-2-amino-1-methoxybenzene and taurine yields on splitting and coupling on the fiber with 2-hydroxynaphthalene-3-carboxylic acid aniline a fast bluish-red dyeing. On splitting again the diazoamino compound obtainable from 5-nitro-2-amino-1-methylbenzene and benzylamino sulfonic acid and then coupling on the fiber with 2 - hydroxynaphthalene - 3 - carboxylic acid-4′anisidide a fast bluish-red dyeing is obtained.

*Example 3.*—A solution of the diazoamino compound (disodium or dipotassium salt) obtainable from 4-chloro-2-amino-1-methoxybenzene and 4-sulfo-2-aminobenzoic acid is mixed in the molecular properties with a solution of 2-hydroxynaphthalene-3-carboxylic acid-2′-anisidide in the calculated quantity of caustic soda, and the whole is evaporated to dryness under reduced pressure. 7.3 parts by weight of this product are made up to 100 parts with Turkey red oil, a little urea, starch tragacanth thickening agent and water. It is then printed on the fiber, steamed and developed in a bath of about 70–90° C. containing 50 parts by weight of 90% formic acid and 100 parts by weight of sodium sulfate per liter; then it is soaped at the boil, rinsed and dried. A clear bluish-red is obtained. On using in an analogous manner the diazoamino compound obtainable from diazotized 2.5-dichloroaniline and 5-sulfo-2-aminobenzoic acid, as well as the 2-hydroxy-naphthalene-3-carboxylic acid-2′-5′-dimethoxyanilide a fast brown dyeing results.

*Example 4.*—4.3 parts by weight (rather more than the calculated quantity) of the condensation product obtainable from 4-chloro-2-amino-1-methylbenzene and 4-sulfo-2-aminobenzoic acid are finely ground together with 3 parts by weight of the sodium salt of 2-hydroxynaphthalene-3-carboxylic acid-2′-methyl-anilide. The mixture is worked up in the customary manner with a neutral thickening agent to 100 parts by weight of printing paste. The materials are then printed and the dyeing is developed in a bath of 70–80° C., containing 30 parts by weight of acetic acid per liter. A brilliant red is obtained of excellent fastness properties. The dyeing fixes very well on hanging.

*Example 5.*—4.2 parts by weight of the diazoamino compound prepared from diazotized 4-chloro-2-amino-1-methyl-benzene and 4-sulfo-2-aminobenzoic acid are ground together with 3.3 parts by weight of 2-hydroxycarbazole-o-carboxylic-2′-anisidide. Then the necessary quantity of caustic soda lye is added, and the whole is made up with a neutral thickening agent to 100 parts by weight. Cotton is printed in the usual manner with this paste and developed in a bath of about 60° C. containing 50 grams of acetic acid per liter. A beautiful yellowish brown is obtained which fixes very well without steaming.

*Example 6.*—The finely ground mixture of the diazo-amino compound prepared from 1/100 mol diazotized 3 - chloro - 1 - aminobenzene and 4-sulfo-2-aminobenzoic acid and 1/100 mol 2 - hydroxynaphthalene - 3 - carboxylic acid-2′-toluidide is made up into a paste with hot water with the addition of 3 parts by weight of dihydroxy-diethyl-sulfide; after the addition of 3 parts by weight of caustic soda lye 36° Bé., 50 parts by weight of neutral starch tragacanth thickening agent, the whole is made up with water to 100 parts by weight.

With this printing paste cotton is printed in the usual manner. The print is finished by steaming the same for about 5 minutes or by hanging for about 12 hours. In both cases the cotton is introduced for a short time into a bath of about 80–90° C. containing in a liter 50 grams of acetic acid and 50 grams of sodium sulfate. Or otherwise the cotton after printing the same can be directly developed without steaming or hanging, and the developing bath may contain formic acid or oxalic acid instead of acetic acid. The various methods of carrying out our process yield after boiling at the soap, rinsing and drying, full clear yellowish-orange shades of excellent fastness properties. The splitting up of the watersoluble diazoamino compound proceeds to a high degree and therefore the diazo compound is well used up. In some cases it is of advantage to add some chromate to the printing paste. Sometimes by the addition of benzylaniline-4-sulfonic acid or another similarly acting agent the evenness of the print is increased.

In the following table there are given the shades of prints obtained by applying the printing and developing processes described in this example to mixtures of coupling components and other condensation products from diazoamino compounds and such primary amines as contain substituents inducing solubility in water:

| Diazoamino compound | Coupling component | Shade |
| --- | --- | --- |
| 4 - chloro-2-amino-1-methylbenzene + 4- sulfo 2-amino-benzoic acid | 2-hydroxy-naphthalene-3-carboxylic acid-2′-ethoxy-anilide | Scarlet |
| 4 - chloro-2-amino-1-methylbenzene + 4- sulfo 2-amino-benzoic acid | di-(aceto-acetic)-tolidide | Reddish-yellow |
| 5-nitro-2-amino-1-methyl-benzene+4-sulfo-2-aminobenzoic acid | 2-hydroxynaphthalene-3-carboxylic acid-2′-methylanilide | Bordeaux |
| 2.5 - dichloro - 1 - aminobenzene + 4-sulfo - 2 -amino-benzoic acid | 2-hydroxynaphthalene-3 - carboxylic acid - 2′.5′-dimethoxyanilide | Yellowish-brown |
| 4.5 - dichloro -2 - amino - 1 - methylbenzene + 4-sulfo-2-amino-benzoic acid | 2-hydroxynaphthalene-3 - carboxylic acid - 2′.5′-dimethoxyanilide | Turkey-red |
| 6-nitro-3-amino-4-methoxy-1 - methyl - benzene + 4 - sulfo - 2 -amino - benzoic acid | 2-hydroxynaphthalene-3-carboxylic acid-1′-naphthylamide | Reddish-violet |
| 2.5 - dichloro - 4 - amino-1-methylbenzene + 4 - sulfo 2-amino-benzoic acid | 2-hydroxynaphthalene-3-carboxylic acid-2′-methoxyanilide | Red |
| 3-chloro-2 -amino - 1 -methylbenzene + 4 -sulfo- 2 -aminobenzoic acid | di-(aceto-acetic)-tolidide | Greenish-yellow |

| Diazoamino compound | Coupling component | Shade |
|---|---|---|
| 4-chloro-2-amino-1-methyl-benzene+4-sulfo-2-amino-benzoic acid | 2-hydroxy-carbazole-o-carboxylic acid-2'-methyl-anilide | Brown |
| 5-nitro-2-amino-1-methyl-benzene+4-sulfo-2-amino-benzoic acid | 2-hydroxy-carbazole-o-carboxylic acid-2'-methyl-anilide | Reddish-brown |
| 4.6-dichloro-2-amino-1-methylbenzene+4-sulfo-2-amino-benzoic acid | 2-hydroxynaphthalene-3-carboxylic acid-2'-methylanilide | Brilliant red |
| 4-benzoylamino-5-methoxy-2-chloro-1-amino-benzene+4-sulfo-2-aminobenzoic acid | 2-hydroxynaphthalene-3-carboxylic acid-2'-methylanilide | Bluish-violet |
| 3.3'-dichloro-4.4'-diamino-diphenyl+4-sulfo-2-aminobenzoic acid | 2.3-hydroxynaphthoic acid-2'-methyl-anilide | Violet |

Obviously in all the foregoing examples, besides the diazoamino compounds obtainable from any desired diazo compounds and any desired aromatic primary amines containing groups inducing solubility in water, there can also be used other coupling components, such as β-naphthol, α-naphthols coupling in the β-position, for example, 4'-hydroxynaphthylphenylketone, pyrazolones, 1:3-dihydroxy-quinolines, sulfazones, acylamino-naphthols, such as 1-(2'-4'-dichloro-benzoyl)-amino-7-naphthol, hydroxy-naphthol carbazole and the like.

It will be obvious from the foregoing disclosure that the term "acid groups" also includes the salts of such groups.

We claim:

1. The process which comprises printing cellulosic fibers with a printing paste containing about molecular quantities of a diazo amino compound of the general formula:

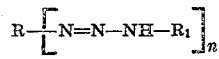

wherein R stands for an aromatic nucleus which may be substituted by any substituents, $R_1$ stands for a substituent of the group consisting of alkyl, aralkyl and aryl, being at least once substituted by a group inducing solubility in water selected from the group consisting of acid groups and residues of quaternary ammonium bases, and $n$ stands for one of the numbers one and two, and of any coupling component, treating the print for a short time in an aqueous acid solution containing about 3–10% of an acid of the group consisting of formic acid, acetic acid and oxalic acid, at a temperature between bout 50 and 90° C., rinsing, soaping at the boil, rinsing and drying the fibers.

2. The process which comprises printing cellulosic fibers with a printing paste containing about molecular quantities of a diazo amino compound of the general formula:

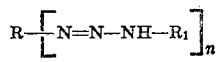

wherein R stands for an aromatic nucleus which may be substituted by any non-acid substituents, $R_1$ stands for a substituent of the group consisting of alkyl, aralkyl, and aryl, being at least once substituted by a group inducing solubility in water selected from the group consisting of acid groups and residues of quaternary ammonium bases, and $n$ stands for one of the numbers one and two, and of any coupling component which may be substituted by any non-acid substituent, treating the print for a short time in an aqueous acid solution containing about 3–10% of an acid of the group consisting of formic acid, acetic acid and oxalic acid, at a temperature between about 50 and 90° C., rinsing, soaping at the boil, rinsing and drying the fibers.

3. The process which comprises printing cellulosic fibers with a printing paste containing about molecular quantities of a diazo amino compound of the general formula:

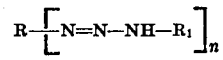

wherein R stands for a benzene nucleus which may be substituted by any non-acid substituents, $R_1$ stands for alkyl, aralkyl, aryl, being at least once substituted by an acid group, and $n$ stands for one of the numbers one and two, and of any coupling component which may be substituted by any non-acid substituent, treating the print for a short time in an aqueous acid solution containing about 3–10% of an acid of the group consisting of formic acid, acetic acid and oxalic acid, at a temperature between about 50 and 90° C., rinsing, soaping at the boil, rinsing and drying the fibers.

4. The process which comprises printing cellulosic fibers with a printing paste containing about molecular quantities of a diazo amino compound of the general formula:

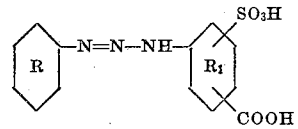

wherein the benzene nuclei R and $R_1$ may be further substituted by any non-acid substituent, and of any coupling component which may be substituted by any non-acid substituent, treating the print for a short time in an aqueous acid solution containing about 3–10% of an acid of the group comprising formic acid, acetic acid and oxalic acid, at a temperature between about 50 and 90° C., rinsing, soaping at the boil, rinsing and drying the fibers.

5. The process which comprises printing cellulosic fibers with a printing paste containing about molecular quantities of a condensation product from diazotized 4-chloro-2-amino-1-methylbenzene and 4-sulfo-2-aminobenzoic acid and of any coupling component which may be substituted by any non-acid substituent, treating the print for a short time in an aqueous acid solution containing about 3–10% of an acid of the group consisting of formic acid, acetic acid and oxalic acid, at a temperature between about 50 and 90° C., rinsing, soaping at the boil, rinsing and drying the fibers.

6. The process which comprises printing cellulosic fibers with a printing paste containing about molecular quantities of a condensation product from diazotized 4-chloro-2-amino-1-methylbenzene and 4-sulfo-2-aminobenzoic acid and of 2-hydroxynaphthalene-3-carboxylic acid-2'-methylanilide, treating the print for a short time in an aqueous acid solution containing about 3–10% of an acid of the group comprising formic acid, acetic acid and oxalic acid, at a temperature between about 70 and 80° C., rinsing, soaping at the boil, rinsing and drying the fibers.

In testimony whereof we have hereunto set our hands.

WINFRID HENTRICH. [L. S.]
CARL TAUBE. [L. S.]